United States Patent [19]

Nodelman

[11] Patent Number: 4,792,576

[45] Date of Patent: Dec. 20, 1988

[54] PRODUCTION OF POLYURETHANE MOLDINGS BY THE REACTION INJECTION MOLDING PROCESS

[75] Inventor: Neil H. Nodelman, Pittsburgh, Pa.

[73] Assignee: Mobay Corporation, Pittsburgh, Pa.

[21] Appl. No.: 76,827

[22] Filed: Jul. 23, 1987

[51] Int. Cl.$^4$ .................. C08J 9/04; C08G 18/28; B29C 45/14
[52] U.S. Cl. ................... 521/174; 264/45.3; 264/53; 264/54; 264/257; 264/300; 264/328.6; 264/328.18; 264/DIG. 83; 528/76
[58] Field of Search ............... 264/53, 54, 257, 328.6, 264/DIG. 83, 300, 328.18; 521/51, 174; 528/76

[56] References Cited

U.S. PATENT DOCUMENTS

| | | | |
|---|---|---|---|
| 3,726,952 | 4/1973 | Boden et al. | 264/53 X |
| 4,065,410 | 12/1977 | Schafer et al. | |
| 4,218,543 | 8/1980 | Weber et al. | 521/51 |
| 4,269,945 | 5/1981 | Vanderhider et al. | 521/159 |
| 4,341,875 | 7/1982 | Visger et al. | 521/164 |
| 4,435,349 | 3/1984 | Dominquez et al. | 264/257 |
| 4,442,235 | 4/1984 | Taylor et al. | 521/122 |

OTHER PUBLICATIONS

Journal of Cellular Plastics, Sep./Oct., 1981, pp. 268-273.

*Primary Examiner*—Philip Anderson
*Attorney, Agent, or Firm*—Gene Harsh; Joseph C. Gil

[57] ABSTRACT

The present invention is directed to a process for the production of polyurethane moldings by reacting a reaction mixture comprising
(a) an organic polyisocyanate
(b) a compatible polyol blend comprising
 (i) at least one polyether polyol having an hydroxyl functionality of from 2 to 8, and a molecular weight of from 350 to below 1800, and
 (ii) at least one hydroxyl functional organic material containing from 2 to 8 hydroxyl groups and having a molecular weight below 350, components (i) and (ii) being used in a weight ratio of component (b)(i) to (b)(ii) of from about 10:1 to about 1:10, and
 (iii) no more than 45% by weight based on the weight of component (b) of an active hydrogen containing compound having a molecular weight of 1800 or more, said reaction mixture being processed as a one-shot system by the RIM process at an isocyanate index of from about 70 to about 130.

11 Claims, No Drawings

PRODUCTION OF POLYURETHANE MOLDINGS BY THE REACTION INJECTION MOLDING PROCESS

BACKGROUND OF THE INVENTION

Reaction injection molding (RIM) has become an important process for the manufacture of a wide variety of moldings. The RIM process is a so-called "one-shot" process which involves the intimate mixing of a polyisocyanate component and an isocyanate-reactive component followed by the injection (generally under high pressure) of the mixture into a mold with subsequent rapid curing. The polyisocyanate component is generally a liquid isocyanate. The isocyanate-reactive component generally contains a high molecular weight isocyanate-reactive component (generally a polyol), and usually contains a chain extender or cross-linker containing amine or hydroxyl groups. U.S. Pat. No. 4,218,543 describes one particularly commercially significant RIM system, which requires the use of a specific type of aromatic amine as a cross-linker/chain extender. The preferred amine described in the '543 patent is diethyl toluene diamine (DETDA). Formulations based on DETDA are generally restricted to the lower flexural modulus range (i.e., less than about 70,000 psi at room temperatue). While it is known to use DETDA in combination with other co-chain extenders in order to increase the flexural modulus of the resultant molding, the use of such co-chain extender generally adversely affects the thermal properties of the resultant part.

In general, the art has looked to various techniques for enhancing the flexural modulus of a RIM part, including use of different aromatic amines (see, e.g. U.S. Pat. No. 4,442,235), use of an aliphatic amine co-chain extender (see, e.g. U.S. Pat. No. 4,269,945), and the use of reinforcements such as fibers, particulate fillers and flakes (see, e.g., Journal of Cellular Plastics, September/October 1981, pages 268–273).

Another technique for enhancing the flexural modulus of RIM parts is to use a reinforcing fiber mat. Problems have been seen in using such mats in the RIM process including displacement of the mat in the mold, incomplete filling of the mold, and part distortion. It is believed that these problems are caused in part by the RIM reactants reaching a high viscosity in too short a time to completely impregnate the mat. One solution to this problem was described in U.S. Pat. No. 4,435,349. The '349 patent describes the use of a reaction mixture of a polyisocyanate, a polyol having an equivalent eeight above 500, a relatively low molecular weight chain extender (such as ethylene glycol), and a delayed action catalyst. In all the examples of the '349 patent, an excess of a polyol was used which had an equivalent weight in excess of 1800 and a molecular weight of no less than about 5500.

U.S. Pat. No. 4,065,410 describes a RIM process wherein the reaction mixture comprises a polyisocyanate, a polyol having a molecular weight of from 1800 to 10,000, a blowing agent, and a chain extender mixture comprising ethylene glycol and another polyol having a molecular weight below 1800. As disclosed in the '410 patent the chain extender mixture comprises from 10 to 30% by weight based on the weight of the high molecular polyol. A similar system is described in U.S. Pat. No. 4,341,875.

DESCRIPTION OF THE INVENTION

The present invention is directed to a process for the production of polyurethane moldings by reacting a reaction mixture comprising
(a) an organic polyisocyanate,
(b) a compatible polyol blend comprising
  (i) at least one polyether polyol having an hydroxy functionality of from 2 to 8, preferably 2 to 4, and a molecular weight of from 350 to below 1800, preferably from 350 to 1100, and
  (ii) at least one hydroxyl functional organic material containing from 2 to 8 hydroxyl groups, preferably 2 or 3 and having a molecular weight of below 350, components (b)(i) and (b)(ii) being used in a weight ratio of (b)(i) to (b)(ii) of from about 10:1 to about 1:10, and
  (iii) no more than 45% by weight based on the total weight of component (b), of an active hydrogen containing compound having a molecular weight of 1800 or more,
said reaction mixture being processed as a one-shot system by the RIM process at an isocyanate index of from about 70 to about 130.

It is preferred that the compatible polyol blend have a viscosity at 25° C. of 200 mPa.s or less. The room temperature flexural modulus of the resultant part has been found to range from about 100,000 psi to as high as about 380,000 psi. In the most preferred embodiment of the present invention, a reinforcing fiber mat is placed in the mold cavity prior to introduction of the reaction mixture. When using reinforcing fiber mats, it has been found that the room temperature flexural modulus of the molded part can range from about 600,000 psi to as high as about 2,000,000 psi. Additionally, none of the flow problems generally seen in art are encountered.

By compatible is meant that no more than 1 percent by weight of the mixture separates after twelve hours storage at room temperature.

Starting polyisocyanate components suitable for use in the present invention include aliphatic, cycloaliphatic, araliphatic, aromatic and heterocyclic polyisocyanates of the type described, for example, by W. Siefken in Justus Liebigs Annalen der Chemie, 562, pages 75 to 136. Specific examples of these compounds are ethylene diisocyanate: 1,4-tetramethylene diisocyanate: 1,6-hexamethylene diisocyanate: 1,12-dodecane diisocyanate: cyclobutane-1,3-diisocyanate, cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or-4,4'-diisocyanate; naphthylene-1,5-diisocyanate: triphenyl methane-4,4',4"-triisocyanate; polyphenyl polymethylene polyisocyanates of the type obtained by condensing aniline with formaldehyde, followed by phosgenation and described, for example, in British Pat. Nos. 874,430 and 848,671 may also be used in the present invention; m- and p-isocyanato-phenylsulfonyl isocyanates according to U.S. Pat. No. 3,454,606. perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,902,007 (U.S. Pat. No. 3,152,162); diisocyanates of the type described in U.S. Pat. No. 3,492,330; and polyisocyanates containing allophanate groups of the type described, for example, in British Pat. No. 993,890, in Belgian Pat. No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Pat. Nos. 1,022,789; 1,222,067 and 1,027,394 and in German Offenlegungsschriften Nos. 1,929,034 and 2,004,408; polyisocyanates containing urethane groups of the type described, for example, in Belgian Pat. No. 752,261 or in U.S. Pat. No. 3,394,164: polyisocyanates containing acylated urea groups according to German Pat. No. 1,230,778 and polyisocyanates containing biuret groups of the type described, for example, in German Pat. No. 1,101,394 (U.S. Pat. Nos. 3,124,605 and 3,201,372) and in British Pat. No. 889,050 are also suitable.

Polyisocyanates produced by telomerization reactions of the type described, for example, in U.S. Pat. No. 3,654,106; polyisocyanates containing ester groups of the type described for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Pat. No. 1,618,380 (U.S. Pat. No. 3,644,457). These may be produced for example, by reacting 1 mol of 4,4'-diisocyanatodiphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Pat. No. 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenylpolymethylene polyisocyanates obtained by the phosgenation of an aniline/formaldehyde condensate. Where reinforcing fiber mats are used, it is particularly preferred that such polyisocyanates have viscosities of 200 mPa. or less at 25° C.

The compatible polyol blend used according to the present invention must include (i) a polyether polyol having a molecular weight of from 350 to below 1800 and (ii) a polyhydroxy material having a molecular weight below 350. Polyethers containing two to four hydroxy groups are preferred. Useful polyethers are known and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylol propane glycerine, 4,4'-dihydroxy diphenyl propane, aniline, ammonia, ethanolamine and ethylene diamine.

Compounds containing at least two hydroxyl groups and having molecular weights of below 350 are also used in the present invention. These materials preferably contain 2 or 3 hydroxyl groups. Mixtures of different compounds containing at least two hydroxyl groups and having molecular weight of less than 350 may also be used. Examples of such low molecular weight compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methy-1,3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, diethylene glycol, triethylene glycol, tetraethylene glycol, higher polyethylene glycols having molecular weights of less than 350, dipropylene glycol, higher polypropylene glycols having molecular weights of less than 350, dibutylene glycol, higher polybutylene glycols having a molecular weight of less than 400, 4,4'-dihydroxydiphenyl propane, dihydroxy methyl hydroquinone, and the like.

Other low molecular weight polyols having a molecular weight of less than 350 which may be used in accordance with the present invention are ester diols, diol urethanes and diol ureas. Suitable ester diols correspond to the general formula

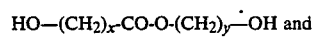
$HO-(CH_2)_x-CO-O-(CH_2)_y-OH$ and

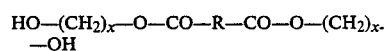
$HO-(CH_2)_x-O-CO-R-CO-O-(CH_2)_x-OH$ wherein
R represents an alkylene radical containing from 1 to 10, (preferably from 2 to 6) carbon atoms or a cycloalkylene or arylene radical containing from 6 to 10 carbon atoms:
x represents 2 to 6; and
y represents 3 to 5.

Examples of compounds corresponding to these formulae are δ-hydroxybutyl-ε-hydroxycaproic acid ester, ω-hydroxy-hexyl-γ-hydroxybutyric acid ester, adipic acid-bis-(β-hydroxyethyl)-ester and terephthalic acid-bis-(-β-hydroxy-ethyl)-ester.

Diol urethanes which may be used in the present invention correspond to the general formula:

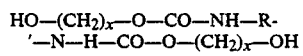
$HO-(CH_2)_x-O-CO-NH-R'-N-H-CO-O-(CH_2)_x-OH$ wherein
R' represents an alkylene radical containing from 2 to 15 (preferably from 2 to 6) carbon atoms or a cycloalkylene or arylene radical containing from 6 to 15 carbon atoms, and
x represents a number of from 2 to 6.

Examples of such diol urethanes are 1,6-hexamethylene-bis-(hydroxybutyl urethane) and 4,4'-diphenylmethane-bis-(-hydroxybutyl urethane). Diol ureas suitable to the present invention correspond to the general formula:

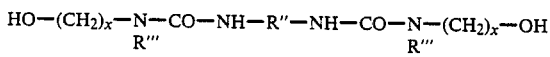

wherein

R" represents an alkylene radical containing from 2 to 15 (preferably from 2 to 9) carbon atoms or a cycloalkylene or arylene radical containing from 6 to 15 carbon atoms, R‴ represents hydrogen or a methyl group, and x represents the number 2 or 3.

Examples of such diol ureas are 4,4′-diphenyl methane-bis-(β-hydroxyethyl urea) and the compound

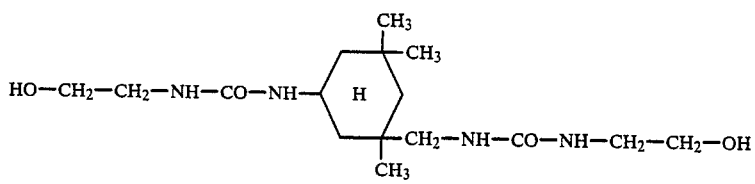

For certain purposes, it may be advantageous to use polyols containing sulfonate and/or phosphonate groups (German Offenlegungsschrift No. 2,719,372), such as the adduct of bisulfite with 1,4-butene diol or the alkoxylation product thereof.

The reinforcing mats useful in this invention comprise glass mats, graphite mats, polyester mats, polyaramide mats such as KEVLAR mats and mats made from any fibrous material. Also, although the particular mats used in the examples are random continuous strand mats made of glass fiber bundles, woven mats and oriented mats such as uniaxial or triaxial mats may also be used.

Water and/or readily volatile organic substances can be used as blowing agents in the invention. Suitable organic blowing agents include halogen-substituted alkanes, such as methylene chloride, chloroform, ethylidene chloride, vinylidene chloride, monofluorotrichloromethane, difluorochloromethane and difluorodichloromethane, and butane, hexane, heptane, or diethyl ether. A blowing effect may also be obtained by adding compounds which decompose spontaneously at temperatures above room temperature, giving off gases such as nitrogen. Examples of such compounds are azo compounds, such as azoisobutyronitrile. Further examples of blowing agents and details on the use of blowing agents may be found in Kunststoff-Handbuch, Vol. VII, published by Vieweg and Hochtlen, Carl-Hanser-Verlag, Munich (1966) on pages 108 and 109 453–455 and 507–510.

Catalysts may also be used in the invention. Suitable catalysts include those known per se, for example tertiary amines such as triethylamine, tributylamine, N-methylmorpholine, N-ethylmorpholine, N-cocomorpholine, N,N,N′,N″-tetramethylethylene diamine, 1,4-diazabicyclo-(2,2,2)-octane, N-methyl-N′-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N′,N′-tetramethyl-1,3-butane diamine, N,N-dimethyl- -phenylethylamine, 1,2-dimethylimidazole and 2-methylimidazole.

Examples of tertiary amines containing hydrogen atoms capable of reacting with isocyanate groups are triethanolamine, triisopropanolamine, N-methyldiethanolamine, N-ethyldiethanolamine, N,N-dimethylethanolamine and their reaction products with alkylene oxides, such as propylene oxide and/or ethylene oxide.

Other suitable catalysts are silaamines having carbon silicon bonds of the kind described in German Pat. No. 1,299,290. These include 2,2,4-trimethyl-2-silamorpholine and 1,3-diethylaminomethyl tetramethyl disiloxane.

Nitrogen-containing bases such as tetraalkyl ammonium hydroxides: alkali hydroxides such as sodium hydroxide; alkali phenolates such as sodium phenolate; alkali alcoholates such as sodium methylate, and hexahydrotriazines may also be used as catalysts.

Organometallic compounds especially organotin compounds may also be used as catalysts. Preferred organotin compounds include tin-(II)-salts of carboxylic acids, such as tin-(II)-acetate, tin-(II)-octoate, tin-(II)-ethylhexoate and tin-(II)-laurate and the dialkyl tin salts of carboxylic acids such as dibutyl tin diacetate, dibutyl tin dilaurate, dibutyl tin maleate or dioctyl tin diacetate.

Further examples of suitable catalysts and details on the way in which the catalysts work can be found in Kunststoff-Handbuch, Vol. VII, published by Vieweg and Hochtlen, Carl-Hanser-Verlag, Munich 1966 page 96–102.

The catalysts are generally used in quantities of from about 0.001 to 10% by weight, based on the quantity of compounds (b).

Surface-active additives (emulsifiers and foam stabilizers) can also be used. Examples of emulsifiers are the sodium salts of castor oil sulphonates or even of fatty acids or salts of fatty acids with amines such as diethylamine oleate or diethanolamine stearate. Alkali or ammonium salts of sulphonic acids, such as those of dodecylbenzene sulphonic acid or dinaphthylmethane disulphonic acid or even of fatty acids, such as ricinoleic acid, or of polymeric fatty acids, can also be used as surface-active additives.

Suitable foam stabilizers include water-soluble polyether siloxanes. These compounds are generally of such structure that a copolymer of ethylene oxide and propylene oxide is attached to a polydimethylsiloxane radical. Foam stabilizers of this kind are described, for example, in U.S. Pat. No. 2,764,565.

It is also possible to use reaction retarders, for example, substances with an acid reaction such as hydrochloric acid or organic acid halides. Cell regulators known per se such as paraffins or fatty alcohols or dimethyl polysiloxanes may also be used. Pigments or dyes and flameproofing agents known per se, such as tris-chloroethyl phosphate or ammonium phosphate and polyphosphate and Mobil's Antiblaze 19 flame retardant may be used. Stabilizers against the effects of aging and weather, plasticizers and substances with fungistatic and bacteriostatic effects, fillers such as barium sulphate, kieselguhr, carbon black or prepared chalk may also be used.

It is also preferred that so-called internal mold release agents be used. Suitable internal mold release agents include those described in U.S. Pat. Nos. 4,585,803, 4,581,386 and 4,519,965, the disclosures of which are herein incorporated by reference. Also useful are those internal mold release agents described in German Offenlegungsschriften 1,953,637 and 2,121,670. One particularly preferred mold release is a mixture of Silicone DC-193 (available from Dow Corning) and the adduct formed by reacting one mole of N,N'-dimethylpropylamine with two moles of tall oil. Although high molecular weight compounds having active hydrogen can be used in amounts of up to 45% by weight based on the total weight of the compatible blend, it is generally preferred that no more than 15% by weight be used and it is most preferred that such use be avoided.

The invention is further illustrated but is not intended to be limited by the following examples in which all parts and percentages are by weight unless otherwise specified.

EXAMPLES

In the examples, the following materials were used:
DEG: diethylene glycol.
EG ethylene glycol.
BD: 1,4-butanediol.
POLYOL A: a glycerine/propylene oxide adduct having an OH number of 250 (molecular weight 670)
POLYOL B: an ethylene diamine/propylene oxide adduct having an OH number of 630 (molecular weight 360).
POLYOL C: a poly(oxypropyleneoxyethylene) glycol having an OH number of 28 (molecular weight 4000) (weight ratio of propylene oxide to ethylene oxide of about 4:1).
ISOCYANATES: all of the isocyanates used were polyphenylpolymethylene polyisocyanates having varying isocyanate group contents, diisocyanate contents, 2,4-isomer contents, equivalent weights, and viscosities, as set forth in TABLE I:

DC-193: a silicone surfactant available from Dow Corning.
T-12: dibutyltindilaurate.
PC-8: Polycat 8, N,N-dimethylcyclohexylamine, available from Air Products.
DBM: dibutyltindimercaptide.
8608 and 8610: continuous strand fiberglass mats available from Owens Corning Fiberglass. The mats are available in 3 oz. or 2 oz. per square foot sizes.

EXAMPLES 1 through 42

RIM plaques were prepared using a laboratory piston metering unit and clamping unit. The metering unit was a two component instrument having a maximum metering capacity of 0.6 liters. A rectangular mold, 300 mm × 200 mm × 3 mm was used to mold the samples under the following conditions:

| | |
|---|---|
| Component A temperature | 25° C. |
| Component B temperature | 25° C. |
| Isocyanate index | 105 |
| Mold Temperature | 60° C. |
| Impingement pressure | 2646 psi |
| Demold time | 2 minutes |

The formulation used and the physical properties obtained were as indicated in the Tables. In those examples having the letter P, the molded part was post cured at 120° C. for one hour. The samples were tested for density (ASTM D-792), notched Izod (ASTM D-256), flex modulus (ASTM D-790), tensile strength (ASTM D-638) and heat distortion (ASTM D-648). In Examples 1 through 40, a silicone spray sold as Chemtrend MR-515 was used as an external mold release agent. In Example 41, a soap spray sold as Chemtrend RCTW-2006 was used as an external mold release agent, while in Example 42, a wax spray sold as Chemtrend 2007 was used as the external mold release agent. In those examples where glass mats were used, they were cut and placed in the mold. The column labelled % glass is the % by weight of glass in the final molded product.

TABLE I

| Isocyanate | % by weight diisocyanate | % of the diisocyanate 2,4' isomer | % by weight NCO Groups | Equivalent Weight | Viscosity at 25° C. |
|---|---|---|---|---|---|
| A | 58 | 2.5 | 32.4 | 129.6 | 45 mPa.s |
| B | 78 | 25 | 32.5 | 129.2 | 25 mPa.s |
| C | 55 | 13 | 32.2 | 130.5 | 60 mPa.s |
| D | 61 | 19 | 32.4 | 129.6 | 45 mPa.s |

Zn: zinc laurate.

TABLE II

EXAMPLES 1-12

| Example | Component B Pbw | | | Component A Iso Pbw | | | | Type | Glass Number Sheets | % by wt. | Density (lb/ft³) | Flex Modulus (Psi) | Notched Izod (ft-lb/in) | Heat Distortion Temp. (°C.) |
|---|---|---|---|---|---|---|---|---|---|---|---|---|---|---|
| | Polyol A | EG | DBM | A | B | C | D | | | | | | | |
| 1 | 90 | 10 | 0.25 | — | — | — | 100 | 8610 3 oz. | 2 | 43 | 86.3 | 1,090,000 | 13.2 | 197 |
| 2 | ↓ | ↓ | ↓ | | | | 100 | — | — | — | 70.9 | 376,000 | 1.17 | 54 |
| 3 | ↓ | ↓ | ↓ | 100 | | | | 8610 3 oz. | 2 | 43 | 86.5 | 1,220,000 | 14.0 | 200 |
| 4 | ↓ | ↓ | ↓ | 100 | | | | — | — | — | 73 | 366,000 | 1.66 | 55 |
| 5-P | ↓ | ↓ | ↓ | | 98 | | | 8610 2 oz. | 3 | 43 | 80.1 | 1,170,000 | 13.4 | 189 |
| 6 | ↓ | ↓ | ↓ | | 98 | | | 8610 2 oz. | 3 | 43 | 77.3 | 1,190,000 | 13.7 | 180 |
| 7 | ↓ | ↓ | ↓ | | 98 | | | — | — | — | 72.6 | 324,000 | 0.95 | 45 |
| 8-P | ↓ | ↓ | ↓ | | 98 | | | — | — | — | 70.9 | 373,000 | 0.98 | 47.5 |
| 9-P | ↓ | ↓ | ↓ | | | 100 | | 8610 2 oz. | 3 | 43 | 76.8 | 1,110,000 | 10.9 | 198 |
| 10 | ↓ | ↓ | ↓ | | | 100 | | 8610 | 3 | 43 | 82.5 | 1,250,000 | 13.3 | 191 |

TABLE II-continued
EXAMPLES 1-12

| Example | Component B Pbw Polyol A | EG | DBM | Component A Iso Pbw A | B | C | D | Type | Glass Number Sheets | % by wt. | Density (lb/ft³) | Flex Modulus (Psi) | Notched Izod (ft-lb/in) | Heat Distortion Temp. (°C.) |
|---|---|---|---|---|---|---|---|---|---|---|---|---|---|---|
| 11-P | ↓ | ↓ | ↓ | | | 100 | | 2 oz. | — | — | 70.9 | 353,000 | 1.35 | 52 |
| 12 | ↓ | ↓ | ↓ | | | 100 | | — | — | — | 71.9 | 365,000 | 1.52 | 48 |

TABLE III
EXAMPLES 13-27

| Example | Component B Pbw Polyol A | Polyol C | EG | DBM | Component A Iso Pbw A | B | C | D | Type | Glass Number Sheets | % by wt. | Density (lb/ft³) | Flex Modulus (Psi) | Notched Izod (ft-lb/in) | Heat Distortion Temp. (°C.) |
|---|---|---|---|---|---|---|---|---|---|---|---|---|---|---|---|
| 13 | 44 | 40 | 16 | 0.25 | 100 | | | | 8610 3 oz. | 2 | 43 | 86.2 | 1,120,000 | 13.8 | 194 |
| 14 | ↓ | ↓ | ↓ | ↓ | 100 | | | | | 2 | 43 | 84.9 | 950,000 | 11.9 | 200 |
| 15 | ↓ | ↓ | ↓ | ↓ | 100 | | | | — | — | — | 73.5 | 191,000 | 2.2 | 50 |
| 16-P | ↓ | ↓ | ↓ | ↓ | | | 100 | | 8610 2 oz. | 3 | 43 | 85.0 | 1,160,000 | 13.3 | 194 |
| 17 | ↓ | ↓ | ↓ | ↓ | | | 100 | | 8610 2 oz. | 3 | 43 | 91.5 | 921,000 | 14.4 | 168 |
| 18-P | ↓ | ↓ | ↓ | ↓ | | | 100 | | — | — | — | 72.6 | 199,000 | 2.0 | 50 |
| 19 | ↓ | ↓ | ↓ | ↓ | | | 100 | | — | — | — | 72.8 | 182,000 | 1.9 | 43.5 |
| 20-P | ↓ | ↓ | ↓ | ↓ | | 100 | | | 8610 2 oz. | 3 | 43 | 83.0 | 959,000 | 14.1 | 184 |
| 21 | ↓ | ↓ | ↓ | ↓ | | 100 | | | 8610 2 oz. | 3 | 43 | 85.4 | 805,000 | 13.9 | — |
| 22-P | ↓ | ↓ | ↓ | ↓ | | 100 | | | — | — | — | 73.0 | 131,000 | 1.9 | 46 |
| 23 | ↓ | ↓ | ↓ | ↓ | | 100 | | | — | — | — | 73.2 | 117,000 | 2.0 | 47.5 |
| 24-P | ↓ | ↓ | ↓ | ↓ | | | | 100 | 8610 2 oz. | 3 | 43 | 68.0 | 874,000 | 12.2 | 182 |
| 25 | ↓ | ↓ | ↓ | ↓ | | | | 100 | 8610 2 oz. | 3 | 43 | 83.9 | 1,290,000 | 13.0 | 185 |
| 26-P | ↓ | ↓ | ↓ | ↓ | | | | 100 | — | — | — | 73.4 | 178,000 | 1.8 | 50 |
| 27 | ↓ | ↓ | ↓ | ↓ | | | | 100 | — | — | — | 73.0 | 162,000 | 2.0 | 46 |

TABLE IV
EXAMPLES 28-31

| Example | Comp. B Pbw Polyol A | EG | DBM | Comp. A Iso Pbw A | Type | Glass Number Sheets | % by weight | Density (lb/ft³) | Flex Modulus (psi) | Notched Izod (ft-lb/in) | Heat Distortion Temp. (°C.) |
|---|---|---|---|---|---|---|---|---|---|---|---|
| 28-P | 85 | 15 | 0.25 | 100 | 8610 2 oz. | 3 | 43 | 88.8 | 1,220,000 | 11.5 | 181 |
| 29 | ↓ | ↓ | ↓ | ↓ | 8610 2 oz. | 3 | 43 | 87.5 | 1,160,000 | 12.7 | 186 |
| 30-P | ↓ | ↓ | ↓ | ↓ | — | — | — | 72.3 | 350,000 | 1.3 | 46 |
| 31 | ↓ | ↓ | ↓ | ↓ | — | — | — | 73.9 | 328,000 | 0.9 | 45 |

TABLE V
EXAMPLES 32-37

| Example | Comp. B Pbw Polyol A | BD | DBM | Comp. A Iso Pbw A | Type | Glass Number Sheets | % by weight | Density (lb/ft³) | Flex Modulus (psi) | Notched Izod (ft-lb/in) | Heat Distortion Temp. (°C.) |
|---|---|---|---|---|---|---|---|---|---|---|---|
| 32-P | 78 | 22 | 0.25 | 100 | 8610 2 oz. | 3 | 43 | 87.6 | 1,110,000 | 11.6 | 200 |
| 33 | ↓ | ↓ | ↓ | ↓ | 8610 2 oz. | 3 | 43 | 88.8 | 1,290,000 | 12.1 | 172 |
| 34 | ↓ | ↓ | ↓ | ↓ | 8610 2 oz. | 3 | 43 | 91.7 | 1,040,000 | 13.1 | 133 |
| 35-P | ↓ | ↓ | ↓ | ↓ | — | — | — | 69.4 | 310,000 | 0.8 | 46 |
| 36 | ↓ | ↓ | ↓ | ↓ | — | — | — | 72.5 | 289,000 | 0.8 | 43 |
| 37 | ↓ | ↓ | ↓ | ↓ | — | — | — | 72.2 | 297,000 | 0.9 | 44 |

TABLE VI
EXAMPLES 38-42

| Examples | Component B, Pbw DEG | EG | Polyol A | Polyol B | Zn | E-493 | DC-193 | T-12 | PC-8 |
|---|---|---|---|---|---|---|---|---|---|

TABLE VI-continued

EXAMPLES 38–42

| | Comp. A Iso. Pbw A | | | | | | | | |
|---|---|---|---|---|---|---|---|---|---|
| 38 | 72 | — | 28 | — | — | — | — | 0.25 | — |
| 39 | — | 10 | 90 | — | — | — | — | 0.25 | — |
| 40 | — | 10 | 90 | — | — | — | — | 0.25 | — |
| 41 | — | 10 | 80.6 | 5.6 | 3.8 | — | — | 0.1 | — |
| 42 | 70 | — | 20 | — | — | 5 | 5 | — | 0.8 |

| Examples | Comp. A Iso. Pbw A | Type | Glass Number Sheets | % by weight | Density (lb/ft³) | Flex Modulus (psi) | Tensile N Strength (psi) |
|---|---|---|---|---|---|---|---|
| 38 | 202 | 8610 3 oz. | 3 | 51 | 96 | 1,320,000 | 31,600 |
| 39 | 100 | 8610 2 oz. | 3 | 42 | 88.5 | 1,110,000 | 23,000 |
| 40 | 100 | 8608 2 oz. | 3 | 40 | 85.9 | 1,200,000 | 26,000 |
| 41 | 101 | 8610 2 oz. | 3 | 39 | 84.3 | 1,200,000 | 23,000 |
| 42 | 192 | 8610 3 oz. | 3 | 52 | 97.1 | 1,670,000 | 32,300 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A process for the production of polyurethane moldings by reacting a reaction mixture comprising
   (a) an organic polyisocyanate
   (b) a compatible polyol blend comprising
       (i) at least one polyether polyol having an hydroxyl functionality of from 2 to 8, and a molecular weight of from 350 to below 1800, and
       (ii) at least one hydroxyl functional organic material containing from 2 to 8 hydroxyl groups and having a molecular weight below 350, components (i) and (ii) being used in a weight ratio of component (b) (i) to (b) (ii) of from about 10:1 to about 1:10, and
       (iii) no more than 45% by weight based on the weight of component (b) of an active hydrogen containing compound having a molecular weight of 1800 or more,
said reaction mixture being processed as a one-shot system by the RIM process at an isocyanate index of from about 70 to about 130.

2. The process of claim 1 wherein said organic polyisocyanate is selected from the group consisting of 4,4'-diisocyanatodiphenylmethane, polyisocyanates based on 4,4'-diisocyanatodiphenylmethane, or mixtures thereof.

3. The process of claim 1, further comprising the step of placing a reinforcing fiber mat in the mold cavity prior to introduction of the reaction mixture.

4. The process of claim 3, wherein component (a) is a polyphenylpolymethylene polyisocyanate obtained by the phosgenation of an aniline/formaldehyde condensate, said polyisocyanate having a viscosity at 25° C. of 200 mPa.s or less, and wherein the viscosity of said compatible polyol blend is 200 mPa.s or less at 25° C.

5. The process of claim 1 wherein said reaction mixture contains a blowing agent.

6. The process of claim 1 wherein component (b)(i) has a hydroxy functionality of from 2 to 4 and a molecular weight of from 350 to 1100.

7. The process of claim 6 wherein said organic material contains 2 or 3 hydroxyl groups.

8. The process of claim 1 wherein component (b)(iii) is present in an amount of no more than 15% by weight.

9. The process of claim 8 wherein component (b)(iii) is excluded.

10. The process of claim 1 wherein said reaction mixture contains a release agent.

11. A polyurethane molding made according to the process of claim 1.

* * * * *